United States Patent [19]
Gehman

[11] Patent Number: 6,073,132
[45] Date of Patent: Jun. 6, 2000

[54] PRIORITY ARBITER WITH SHIFTING SEQUENTIAL PRIORITY SCHEME

[75] Inventor: Judy M. Gehman, Fort Collins, Colo.

[73] Assignee: LSI Logic Corporation, Milpitas, Calif.

[21] Appl. No.: 09/049,500

[22] Filed: Mar. 27, 1998

[51] Int. Cl.[7] .................................................. G06F 17/30
[52] U.S. Cl. ................................... 707/9; 707/1; 707/10; 710/100; 710/111; 710/116; 710/117; 710/241; 710/200
[58] Field of Search ............................ 707/1, 9, 10, 200, 707/201, 202, 203, 204; 710/100, 111, 116, 117, 119, 200, 241, 244

[56] References Cited

U.S. PATENT DOCUMENTS

| | | | |
|---|---|---|---|
| 4,787,033 | 11/1988 | Bomba | 710/116 |
| 4,814,974 | 3/1989 | Narayanan | 710/244 |
| 4,924,380 | 5/1990 | McKinney et al. | 710/111 |
| 5,072,363 | 12/1991 | Gallagher | 710/241 |
| 5,146,596 | 9/1992 | Whittaker et al. | 710/116 |
| 5,241,632 | 8/1993 | O'Connell et al. | 710/117 |
| 5,303,382 | 4/1994 | Buch et al. | 710/244 |
| 5,392,033 | 2/1995 | Oman et al. | 340/825.5 |
| 5,487,170 | 1/1996 | Bass et al. | 710/244 |
| 5,546,548 | 8/1996 | Chen et al. | 710/116 |
| 5,566,305 | 10/1996 | Levenstein | 710/119 |
| 5,583,999 | 12/1996 | Sato et al. | 710/100 |
| 5,586,331 | 12/1996 | Levenstein | 710/200 |

*Primary Examiner*—Thomas G. Black
*Assistant Examiner*—Diane D. Mizrahi

[57] ABSTRACT

An improved data processing system and in particular an improved data processing system that more effectively manages a shared resource within a data processing system. More specifically, a method and apparatus for managing access to a shared resource between a plurality of devices simultaneously requesting access to the shared resource. The present invention implements a design that combines a priority configuration and a shifting sequential configuration. The access is controlled by an arbiter that determines access to the shared resource by granting first, to priority devices and then to the highest priority shifting sequential device requesting access within one clock cycle of a device terminating its request for access to the shared resource. In addition, the present invention employs a dynamic shifting sequential priority scheme by assigning lowest priority to a shifting sequential device once the device terminates its request to access the shared resource while simultaneously incrementally increasing the priority levels of the remaining shifting sequential devices.

32 Claims, 4 Drawing Sheets

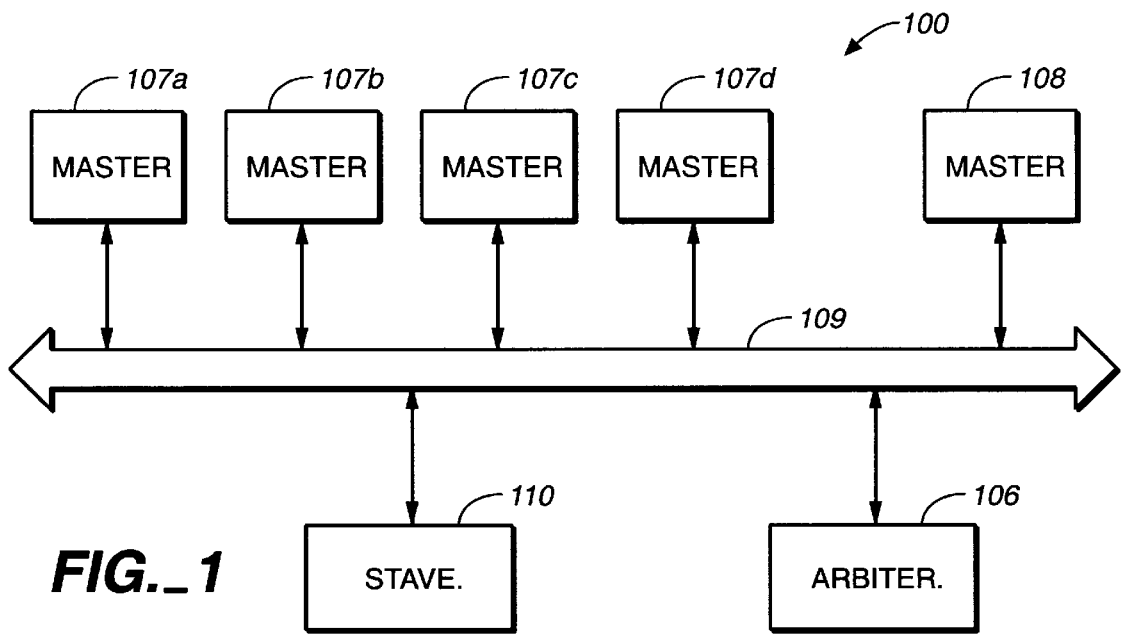

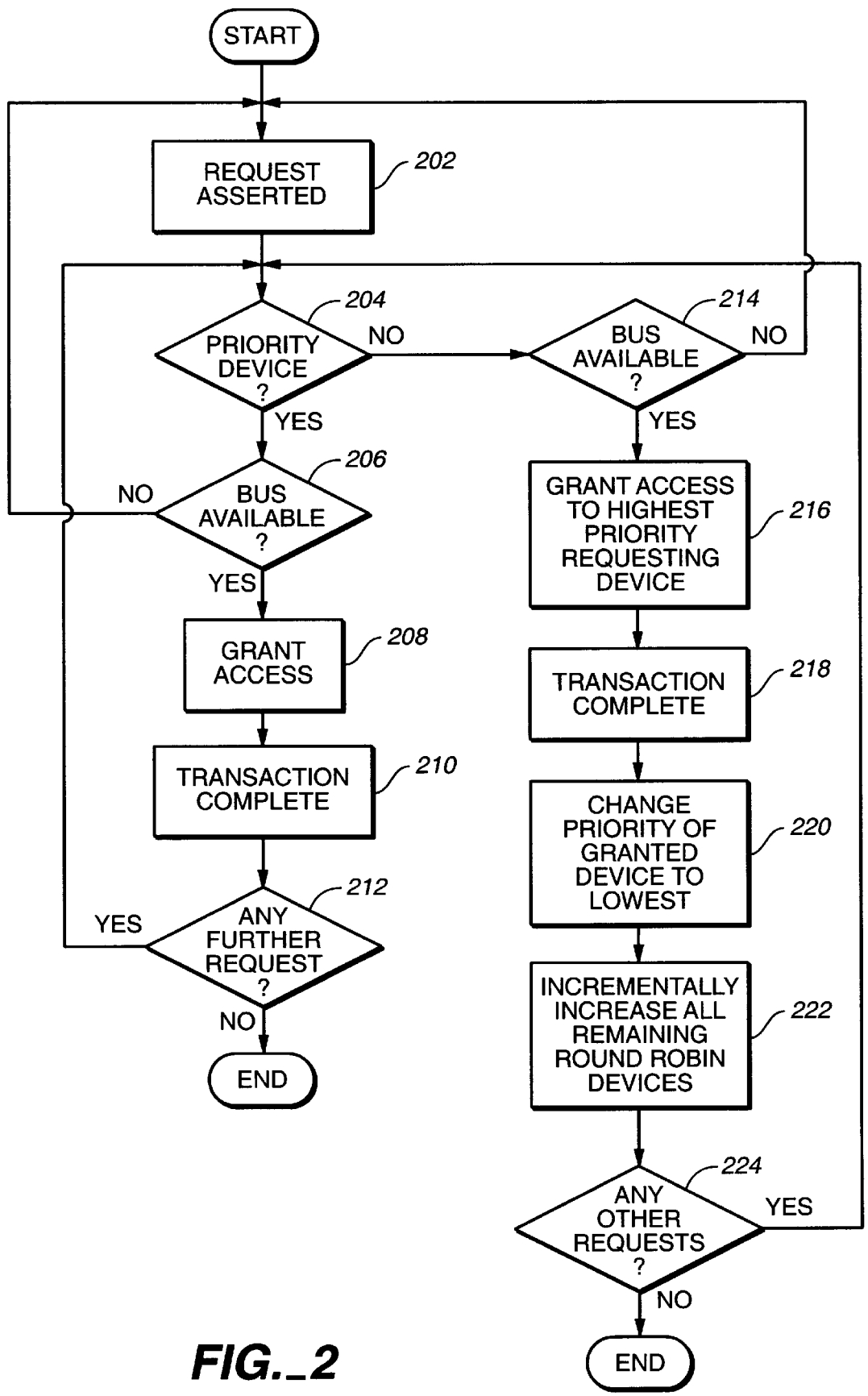
FIG._2

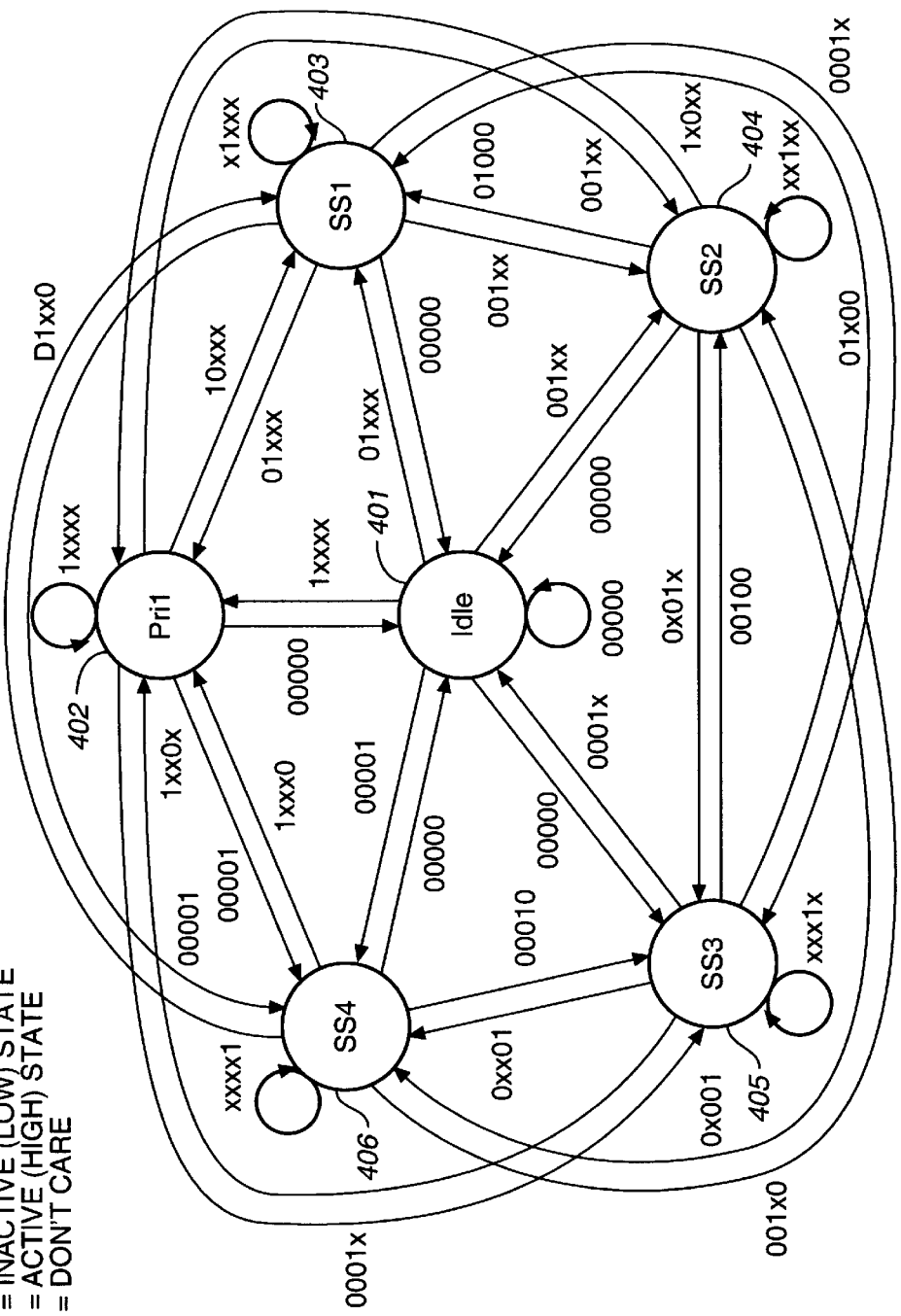
FIG._4

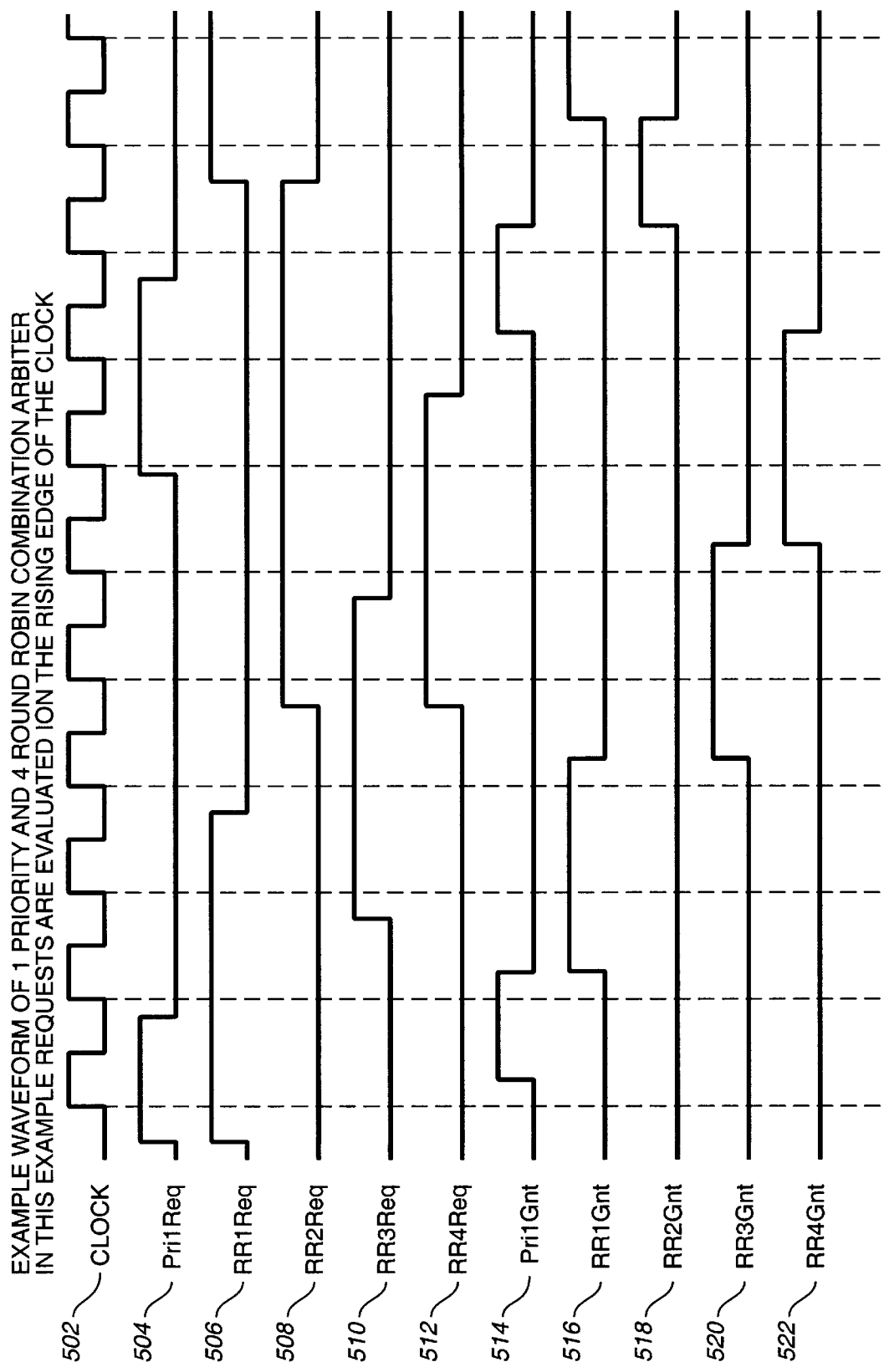

PRIORITY ARBITER WITH SHIFTING SEQUENTIAL PRIORITY SCHEME

BACKGROUND OF THE INVENTION

1. Technical Field

The present invention generally relates to arbitration of shared resources within a data processing machine and to dynamically alter priority of those devices assigned to a shifting sequential scheme.

2. Description of the Related Art

Data processing systems typically involve a compilation of various components that interrelate. Typically, in modem data processing systems, one or more devices within the system access a shared resource such as a system bus. This shared resource is one which can only transmit data or communicate with one of the competing devices or requestors at any given time. Therefore, some scheme must be employed to grant authority to use the shared resource when multiple simultaneous requests occur. An arbiter manages selection of which device may use the shared resource when a request or requests are made. The arbiter will select the device to access the shared resource according to some priority configuration, whereby one device takes precedence over another.

In modem computing systems it is a typical design requirement not to allow one particular device to dominate a shared resource. Therefore, two prior art schemes have been instituted in order satisfy this design requirement. These schemes are typically designated as priority and fairness schemes.

It is known that a priority scheme statically assigns priority for each device that has access to a shared resource. When two or more simultaneous requests occur, the arbiter grants access to the device having the highest priority. Once the highest priority device terminates its request, the arbiter grants access to the next highest priority device. The priority of each device under this scheme never changes. Accordingly, a priority scheme creates situations whereby lower priority devices are unable to access the shared resource for extended periods of time.

In a fairness scheme known as Round Robin Arbitration, all resources have the same priority level. However, one device has priority over another device when a device has what is called a "token". In such a scheme, all devices gain priority over all the others in a specified sequence in that the "token" is passed from one device to another in a set order. No device within the Round Robin scheme may access the shared resource without first having this "token". When a device having the "token" is at the top of the order and the requesting device is at the bottom of the order, the "token" must be passed to each intermediate device before reaching the requesting device.

As can be seen by the aforementioned description, a major disadvantage with the Round Robin scheme is that the shared resource remains idle while the "token" is passed to a device requesting access to the shared resource. In relative terms, this lag in time can be long or short depending upon the relative positions of the requesting device and the device with the "token". The Round Robin scheme, therefore, causes inefficient use of the shared resource.

Furthermore, under a Round Robin scheme no weight is given to a device having more critical functions than less critical devices. As a result, critical operations of the data processing system may be delayed because less critical functions tie up the shared resource merely because the less critical device has the "token". Therefore, critical devices have no priority over the other devices in the Round Robin scheme, and as such, the data processing system functions less effectively and efficiently.

Therefore, it would be advantageous to develop a scheme which allows access to requesting devices of lower priority within one clock cycle of the data processing system, while also providing for weighting of priority in favor of more critical devices.

SUMMARY OF THE INVENTION

An apparatus and method for arbitrating access to a shared resource within a data processing system between a plurality of devices. The arbitration scheme allows for greater priority weight to be placed on certain devices depending on how the device is assigned. The arbitration scheme employs both a priority scheme and a shifting sequential scheme in order to achieve greater access to a shared resource by critical function devices, while improving fairness to those devices less critical. Devices within the data processing system are assigned as either priority devices or shifting sequential devices. Between simultaneous requests by the devices, the arbiter grants access to the shared resource first to any requesting priority device. Thereafter, the arbiter grants access to the highest priority requesting shifting sequential device. Once the request is terminated by a shifting sequential device, that device becomes the lowest priority device and the other devices incrementally advance in priority depending upon their relative position to the terminating device.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a broad diagram illustrating configuration of a bus control system including a bus arbiter in accordance with the present invention;

FIG. 2 is a flowchart showing the operation of the bus arbiter in accordance with this invention;

FIG. 3 is a table reflecting the priorities for each state of the arbiter in accordance with the present invention;

FIG. 4 is a state machine having one priority and four shifting sequential combination arbiters in accordance with the present invention;

FIG. 5 is a waveform for a one priority and four shifting sequential combination arbiter as compared to the system bus clock in accordance with the present invention; and FIG. 6 is a table reflecting the priority scheme immediately following the release of the shared resource by a device in accordance with the present invention.

DETAILED DESCRIPTION

FIG. 1 demonstrates a data processing system 100 containing connecting systems between a plurality of devices 107a, 107b, 107c, 107d, and 108, shared resource 109 and arbiter 106 in which the present invention may be implemented. According to FIG. 1, each device 107a, 107b, 107c, 107d, and 108 is connected to shared resource 109, such as a system bus. These devices are master devices such as a processor, SCSI Controllers, Ethernet, or any other master devices that may be connected to shared resource 109. Device 110 is a slave device (i.e., a memory or disk drive) that devices 107a, 107b, 107c, 107d, and 108 may try to access using shared resource 109. In addition, not only can this configuration be employed for personal computers but can also be employed on a system level with devices such as RISC processor, memory, a SCSI controller core, or a PCI interface core connected to a shared resource.

Prior to accessing the shared resource 109, one of the devices 107a, 107b, 107c, 107d, and 108 will assert a request to the arbiter 106. The arbiter 106 will then either grant access to shared resource 109 or deny access to the shared resource 109 according to that certain priority scheme identified in FIG. 2. If arbiter 106 grants access to one of the devices 107a, 107b, 107c, 107d, and 108 and no other devices 107a, 107b, 107c, 107d, and 108 will be granted access until the accessing device terminates its request.

In the event, two or more of devices 107a, 107b, 107c, 107d, and 108 assert requests simultaneously, arbiter 106 will initially grant access to only one of the devices 107a, 107b, 107c, 107d, and 108 and then only according to the priority scheme identified in FIG. 2. Once the granted device 107a, 107b, 107c, 107d, and 108 completes its transaction, the other requesting devices 107a, 107b, 107c, 107d, and 108 will each have access depending upon their priority at the time of the request.

In the depicted example, both a priority and shifting sequential arbitration scheme are employed in data processing system 100. In the depicted example, the data processing system 100 contains a single priority device, device 108, along with four shifting sequential devices, devices 107a, 107b, 107c, and 107d. With respect to the shifting sequential devices, the priorities are changed after each request is serviced from one of the shifting sequential devices. When multiple requests are received, the master with the highest priority is granted the shared resource. In the depicted example, the master granted the shared resource may keep the shared resource until the master device times out or inactivates its request, depending upon the desired method of monitoring the master devices' time on the shared resource. Grant of the shared resource to the master device, changes priority if the master device is a shifting sequential master device. In accordance with the preferred embodiment of the present invention, the master device is granted the bus and becomes the lowest priority device after completion of the transaction.

Each master device has an opportunity to be the highest priority device in this shifting sequential scheme. When the master device, as the highest priority device, is finished with its transaction, it will inactivate its request and become the lowest priority master device. The second highest master device will become the highest priority device of the shifting sequential arbitration scheme and all other master devices shift up one in priority. The arbiter will not grant another master device, until the current master's transaction is completed (signaled by inactivating its request). This means even the request with higher priority than the devices in the shifting sequential arbitration scheme can not interrupt a transaction. The present invention allows the transaction to complete.

Furthermore, a master device has no time limit on the bus in accordance with a preferred embodiment of the present invention. The master device can keep the shared resource until the master device releases (unactivates) its request. According to the present invention, the arbiter does not count bus cycles or have a watch dog timer though this can be easily added and is independent of the concept of mixing priority and shifting sequential arbitration schemes. This arbiter does not look for or signal errors on the shared resource.

If no other devices are requesting the shared resource except one of the master devices with a low priority in the current shifting sequential arbitration scheme, the master device gets the bus on that cycle. It does not have to wait several cycles for the shifting sequential arbitration scheme to rotate around to make that request the highest priority.

When multiple requests are received, the master device that has the highest priority of those requesting is granted and the priorities are changed after the transaction is completed. The granted master device becomes the lowest priority device after its transaction is completed.

Although the configuration in FIG. 1 demonstrates four shifting sequential devices 107a, 107b, 107c, 107d and one priority device 108, the configuration could contain more or fewer shifting sequential devices 107a, 107b, 107c, 107d or more or fewer priority devices 108. The depicted example in FIG. 1 is not intended to imply any structural or architectural limitations with respect to master devices accessing a shared resource.

Turning now to FIG. 2, a flowchart showing the operation of arbiter 106 in determining priority between the devices 107a, 107b, 107c, 107d, and 108 in accordance with a preferred embodiment. Each device 107a, 107b, 107c, 107d, and 108 is either priority device 108 or a shifting sequential device 107a, 107b, 107c, and 107d. In the depicted example, the evaluation of the request and the issue of a grant in response to the request are performed in a single clock cycle.

According to FIG. 2, a request is asserted by one or more of the devices 107a, 107b, 107c, 107d, 108 (step 202). Arbiter 106 determines whether any of the requesting devices 107a, 107b, 107c, 107d, and 108 are priority devices (step 204). If one of the devices 107a, 107b, 107c, 107d, and 108 is a priority device, then the arbiter 106 determines the availability of the shared resource 109 (step 206). If shared resource 109 is unavailable, arbiter 106 returns to step 202 to evaluate the requests at the next clock cycle. Once shared resource 109 is available and priority device 108 is still requesting shared resource 109, arbiter 106 grants priority device 108 access to shared resource 109 (step 208). When the transaction of the priority device 108 is complete (step 210), arbiter 106 determines whether any requests are pending (step 212). If not, the state machine is placed in an idle state. If, however, other requests are pending, the arbiter 106 follows the same process as detailed in steps 202–212, unless the pending request is not a priority device 108. The present invention reduces inefficiency by granting access to the shared resource 109 to certain critical devices of the data processing system assigned as priority device 108. This feature eliminates the occurrence of extended suspensions of critical functions of the system.

When a pending request is made by a shifting sequential device 107a, 107b, 107c, and 107d, arbiter 106 first determines the availability of shared resource 109 (step 214). If shared resource 109 is not available, arbiter 106 returns to step 202 to evaluate the requests at the next clock cycle. If shared resource 109 is available, arbiter 106 grants access to shared resource 109 to the highest priority shifting sequential device requesting access (step 216). In this manner, the present invention eliminates the inefficiency of passing the "token" as is necessary in a shifting sequential arbitration scheme.

Once the granted device's transaction is complete (step 218), arbiter 106 changes the priority of the granted device to the lowest priority (step 220) and re-configures the priority of the remaining shifting sequential devices 107a, 107b, 107c, 107d (step 222) according to that found in FIG. 6. Arbiter 106 then determines if any other requests are pending (step 224). If not, the state machine is placed in the idle state. If, however, other pending requests exist, arbiter 106 returns to step 204 as described above. The process returns to step 204 in the depicted example because the next request could be a priority request or a shifting sequential request. A priority request may have become active while servicing the shifting sequential request. In this case, the priority request would have priority over the next shifting sequential.

A state machine controls the issuing of grants by arbiter 106. Each device 107a, 107b, 107c, 107d, and 108 has a state that indicates it is receiving the grant from arbiter 106. The idle state occurs when no requests are active. In this state, either no grants are issued by arbiter 106 or a default device receives the grant. The latter is referred to as "parking". FIG. 3 is a table demonstrating which state is receiving the grant and the relative priorities of all remaining priority devices 108 and shifting sequential devices 107a, 107b, 107c, and 107d. First row 302 identifies the current state of the state machine shown in FIG. 4. Rows 304–312 show the relative priority of the devices, highest to lowest, in that column for that state. The granted device has the highest priority (row 304). For instance, in the column for which SS2 is the state, the SS2 device 107b is the highest priority, the Pri1 device 108 is the second highest priority, the SS3 device 107c is the third highest priority, the SS4 device 107d is the next highest priority and the SS1 device 107a is the lowest priority while in the SS2 state. In this manner, the present invention allows a device to be designated as having the higher priority over the shifting sequential devices 107a, 107b, 107c, and 107d such that a device having certain critical functions can be assigned this highest priority. Furthermore, the present embodiment improves fairness to those devices assigned to the shifting sequential scheme by re-configuring the priority scheme such that the device last having access to shared resource 109 has the lowest priority.

With reference now to FIG. 4, a diagram of a state machine for one priority device and four shifting sequential devices is depicted in accordance with a preferred embodiment of the present invention. The state machine in FIG. 4 is implemented in an arbiter, such as arbiter 106 in data processing system 100 in FIG. 1. Inputs into the state machine are in the form of requests from the devices with outputs being in the form of a grant from the shared resource to a device in response to the input. The state machine diagram shows six enclosed circles 401, 402, 403, 404, 405, and 406, representing states within the arbiter used to determine which devices, such as devices in FIG. 1, will have access to shared resource 109. Each state is connected to every other state by two arrows pointed in opposing directions. These arrows represent a transfer of shared resource 109 from the device from which the arrow begins to the device in which the arrow points.

Furthermore, each device 107a, 107b, 107c, 107d, and 108, and the idle state, has a circular arrow attached to one side. Next to each arrow is a set of five figures, which represent the request state of each device. The five figures represent the request state of each device 107a, 107b, 107c, 107d, and 108 whereby the first figure is the request state of priority device 108, the second figure is the request state of the SS1 device 107a, the third figure represents the request state of the SS2 device 107b, the fourth figure is the request state of the SS3 device 107c and the fifth figure represents the request state of the SS4 device 107d. Each figure within the set of figures may be one of three characters. A zero represents no active request; a one represents an active request; and an "x" signifies irrelevancy in determining priority to shared resource 109.

As shown in FIG. 4, each arrow pointing away from one of the devices indicates release of shared resource 109 in favor of the device to which the arrow points. While in operation, each device 107a, 107b, 107c, 107d, and 108 is either asserting a request or not asserting a request. The set of numbers next to the arrows indicate the request state of each device 107a, 107b, 107c, 107d, and 108 when the level of priority in descending order is Pri1 device 108, the SS1 device 107a, the SS2 device 107b, the SS3 device 107c and the SS4 device 107d before transfer of shared resource 109 occurs.

To further illustrate, the set of figures for the arrow pointing from the Pri1 device 108 to the SS3 device 107c is "0001x". As mentioned above, the Pri1, SS1, and SS2 devices 108, 107a, 107b all have greater priority than the SS3 device 107c, while the SS4 device 107d has lower priority when in the Pri1 state. According to the set of figures next to the arrow, for transfer to occur, neither the Pri1, SS1 nor the SS2 device may be asserting a request, the SS3 device 107c must be asserting a request, and whether or not the SS4 device 107d is asserting a request is irrelevant since the SS3 device 107c has priority over the SS4 device 107d. In this manner, the present invention allows direct transfer of shared resource 109 to devices having lower priority than the remaining devices without the need for intermediate steps.

Turning next to FIG. 5, a sample waveform for one priority device 108 and four shifting sequential devices 107a, 107b, 107c, and 107d are compared to the clock cycle in accordance with the preferred embodiment of the present invention. Signal 502 is a clock signal and signals 504, 506, 508, 510, and 512 represent requests by the various devices over time. The signals 514, 516, 518, 520, and 522 represent requests when the respective devices 107a, 107b, 107c, 107d, and 108 are granted access to shared resource 109.

FIG. 5 demonstrates that only one clock cycle is required to grant access to shared resource 109 that is not engaged by another device 107a, 107b, 107c, 107d, and 108. Arbiter 106 evaluates shared resource 109 on the rising edge of clock signal 502, and if shared resource 109 is available, arbiter 106 grants access to the highest priority device 107a, 107b, 107c, 107d, and 108 requesting access. Although the depicted example illustrates using the rising edge of the clock, the present invention may be implemented using either edge of a clock signal.

As seen with reference to signals 504 and 506, priority device 108 asserts a request simultaneously with the SS1 device 107a. Arbiter 106 determines that priority device 108 is among the requesting devices (step 204) and then confirms availability of shared resource 109 (step 206) on the rising edge of clock signal 502. According to signals 514 and 516, priority device 108 is granted access prior to the SS1 device 107a. Furthermore, the grant to priority device 108 is not given until after arbiter 106 confirms the availability of shared resource 109 (step 206).

The priority device 108 discontinues asserting its request as shown by the waveform in signal 504, while the SS1 device 107a continues to assert its request. As shown in signal 516, arbiter 106 grants access to the SS1 device 107a when priority device 108 releases shared resource 109.

While the SS1 device 107a is accessing shared resource 109, the SS3 107c begins asserting a request as shown by signal 510. However, arbiter 106 does not grant access to the SS3 device 107c while the SS1 device 107a is accessing shared resource 109. As signal 506 indicates, the SS1 device 107a discontinues requesting access and the SS1 device 107a is assigned the lowest priority (step 220) as more fully seen in FIG. 6. Concurrently, arbiter 106 incrementally increases the priority of the SS2 107b, SS3 107c and SS4 107d devices (step 220) from highest to lowest respectively.

Immediately after the following rising edge of clock signal 502, the SS3 device 107c is granted access to shared resource 109 as shown in signal 520 even though the SS3 device 107c has the second highest priority. In this manner, the present invention improves on existing arbiters employing a shifting sequential arbitration scheme in that intermediate steps are not required before a device is granted access to shared resource 109.

Thereafter, the SS2 device 107b and the SS4 device 107d begin asserting requests simultaneously while the SS3 device 107c is accessing shared resource 109 as seen in signals 508, 512, and 520. Once the SS3 device 107c discontinues asserting its request, arbiter 106 changes the priority of the SS3 device 107c to lowest (step 220) and re-configures the priority of the SS4 device 107d to that of highest priority (step 222). Arbiter 106 assigns shared resource 109 to the SS4 device 107d immediately after the rising edge of clock signal 502 from when the SS3 device 107c discontinues requesting access as shown in signals 502, 510, and 522. The SS4 device 107d takes higher priority than the SS2 device 107b as more fully shown in the re-configured sequence outlined in FIG. 6 below.

As further seen in FIG. 5, arbiter 106 grants access to shared resource 109 to the highest priority devices 107a, 107b, 107c, 107d, and 108 that is requesting access irrespective of when the request is asserted. Signals 504 and 508 show a request by priority device 108 initiated after a request by the SS2 device 107b. As always, priority device 108 has higher priority over any of the shifting sequential devices 107a, 107b, 107c, and 107d (step 204). As signals 514 and 518 demonstrate, priority device 108 obtains access to shared resource 109 prior to the SS2 device 107b even though the SS2 device 107b made its request first.

In this manner, the present invention improves fairness between the devices 107a, 107b, 107c, 107d, and 108 by allowing any device 107a, 107b, 107c, 107d and 108 regardless of priority, to maintain access to the shared resource until such time as the device terminates its request for the shared resource 109.

FIG. 6 illustrates the priority schemes immediately in place after a device terminates request for the shared resource 109. First row 602 represents the state from FIG. 4 which was last active. First row 602 further demonstrates a possible order, from left to right, in which devices are granted access, and thereafter relinquish the shared resource 109 where the state idle represents no grants or the default device is granted access. The columns 614, 616, 618, 620, 622, and 624 indicate the re-configured priority levels of each device 107a, 107b, 107c, 107d, and 108 in descending order after the device identified in first row 602 terminates access to shared resource 109.

FIG. 6 more clearly shows that each shifting sequential device 107a, 107b, 107c, and 107d remains statically relative to each other shifting sequential devices 107a, 107b, 107c, and 107d even when the priority level is shifted after termination of devices 107a, 107b, 107c, and 107d. After Pri1 is done, the sequential shifting sequence is reset to SS1, SS2, SS3, and SS4. In the depicted example, arbiter 106 does not remember the sequence after Pri1 was serviced. This is further illustrated by comparing the priority levels in the second and sixth columns 616 and 624. As can be seen, the SS1 device 107a is the lowest priority shifting sequential device 107a, 107b, 107c, and 107d after terminating access to shared resource 109. However, the SS1 device 107a becomes the highest priority shifting sequential device 107a, 107b, 107c, and 107d after the preceding transaction because the SS4 device 107d had access to shared resource 109.

FIG. 6 further demonstrates that each shifting sequential device 107a, 107b, 107c, and 107d remains relative to one another and that the priority levels identified in the second to the last columns 616, 618, 620, 622, and 624 will always be the priority levels after the device identified in first row 602 completes its transaction. The idle state as shown in column 614, results in the priorities being reset to the beginning sequence in idle and Pri1 states. In this manner, the present invention allows incorporation of a weighting factor to be applied to those devices in the shifting sequential scheme.

It is known that certain devices will access shared resource 109 more often than other devices. Furthermore, devices having critical functions may not access the shared resource as often. By positioning a device having critical function immediately below a device that accesses shared resource 109 quite often, the device having critical functions will be have highest priority among the shifting sequential devices 107a, 107b, 107c, and 107d for longer periods of time than the remaining devices.

For example, if one knows that the SS1 device 107a is a device that places more requests to access shared resource 109 than all the other devices 107b, 107c, and 107d, then one should designate a device having critical functions as the SS2 device 107b. As shown in FIG. 6, once the SS1 device 107a completes its transaction, the SS2 device 107b has highest priority among the shifting sequential devices 107a, 107b, 107c, and 107d. Therefore, the SS2 device 107b maintains a high priority for longer periods of time than the other devices merely because the SS1 device 107a is accessing shared resource 109 more often than the other devices.

Thus, the present invention provides an improved method and apparatus for arbitrating access to a shared resource, such as a bus, in which fairness in accessing the shared resource is provided. This advantage is provided through a mixture of priority and shifting sequential arbitration schemes being implemented to arbitrate access to the shared resource. As described above, the present invention creates a priority scheme whereby certain devices within a data processing system can be given varying weights of priority in order to access a shared resource depending on the critical nature of the device, whereby the efficiency and fairness of the data processing system is improved.

The description of the preferred embodiment of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

What is claimed is:

1. A method in a data processing system for arbitrating access to a shared resource by a plurality of devices, wherein each of the plurality of devices is associated with a priority, the method comprising:

receiving requests from a number of devices within the plurality of devices for access to the shared resource;

identifying each device within the number of devices;

in response to one of the devices within the number of devices being identified as a priority device, granting the priority device to access the shared resource;

in response to the number of devices being identified as a number of devices with shifting priorities, granting access to the shared resource to a device within the number of devices having a highest priority among the number of devices from which the requests were received; and shifting the priority of the device having the highest priority to a lowest priority and shifting the priority of remaining devices within the plurality of devices having shifting priorities after granting the device access to the shared resource.

2. The method of claim 1, wherein a number of devices within the plurality of devices having shifting priorities and further comprising:

receiving a single request from a device within the number of devices;

in response to receiving a single request from a device having a shifting priority, granting the device access to the shared resource, wherein the device is a selected device; and shifting the priority of the selected device to a lowest priority among the plurality of devices.

3. The method of claim 2, wherein the selected device has a priority other than the highest priority among the number of devices and wherein the selected device is granted access to the shared resource without having to wait for the priority of the selected device to shift to the highest priority among the number of devices.

4. The method of claim 2 further comprising:

shifting priorities of devices within the number of devices other than the selected device relative to the selected device.

5. The method of claim 4, wherein priorities of the number of devices remain fixed with respect to each other as the priorities of the number of devices shift.

6. The method of claim 1, wherein the shared resource is a bus.

7. The method of claim 1, wherein a device granted access to the shared resource maintains control of the bus until the device releases the shared resource.

8. The method of claim 1 further comprising:

detecting a release of the shared resource by the device granted access to the shared resource by detecting a deassertion of the request from the device.

9. A data processing system comprising:

a priority device;

a plurality of devices having shifting priorities, wherein each device within the plurality of devices has a priority relative to other devices within the plurality of devices;

detection means for detecting requests from a number of devices within the plurality of devices for access to the shared resource;

identification means for identifying each device within the number of devices;

first granting means, responsive to detecting a request from the priority device, for granting the priority device to access the shared resource;

second granting means, responsive to detecting requests from a number of devices within the plurality of devices, for granting access to a device within the number of devices having a highest priority among the number of devices from which the requests were detected; and shifting means, responsive to the second granting means granting access to a device, for shifting the priority of the device having the highest priority to a lowest priority and for shifting the priority of remaining devices within the plurality of devices having shifting priorities.

10. The data processing system of claim 9 further comprising:

means, responsive to receiving a single request from a device within the plurality of devices, for granting the device access to the shared resource, wherein the device is a selected device; and second shifting means for shifting the priority of the selected device to a lowest priority among the plurality of devices.

11. The data processing system of claim 10, wherein the selected device has a priority other than a highest priority among the plurality of devices and wherein the selected device is granted access to the shared resource without having to wait for the priority of the device to shift to the highest priority among the number of devices.

12. The data processing system of claim 9 further comprising:

third shifting means for shifting priorities of devices within the plurality of devices other than the selected device relative to the selected device.

13. The data processing system of claim 12, wherein priorities of the plurality of devices remain fixed with respect to each other as the priorities of the number of devices shift.

14. The data processing system of claim 9, wherein the shared resource is a bus.

15. The data processing system of claim 9, wherein a device granted access to the share resource maintains control of the bus until the device releases the shared resource.

16. The data processing system of claim 9, wherein the data processing system is located on a chip.

17. The method of claim 9, wherein the data processing system is a personal computer.

18. A method for arbitrating access to a shared resource among devices in a data processing system, wherein the devices include a device of a first type and a plurality of devices of a second type, the method comprising:

monitoring the devices for requests for the shared resource;

granting the device of the first type access to the shared resource in response to detecting a request from the first device;

granting access to a selected device within the plurality of second devices of the second type in response to a request from the selected device and an absence of a request from the device of the first type, wherein the selected device has a greater priority than other devices within the plurality devices of the second type; and changing priorities among the plurality of devices of the second type, wherein the selected device has a lowest priority.

19. The method of claim 18, wherein the granting steps occur within a single clock cycle.

20. The method of claim 18, wherein the shared resource is a bus.

21. A data processing system comprising:
   a shared resource;
   a priority device coupled to the shared resource;
   a plurality of shifting priority devices coupled to the shared resource;
   an arbiter coupled to the shared resource, wherein the arbiter has a plurality of modes of operation including:
      a first mode of operation in which the arbiter monitors for requests for the shared resource;
      a second mode of operation, responsive to detecting at least one request for the shared resource in the first mode of operation, in which the arbiter identifies a device for each request detected;
      a third mode of operation, in response to identifying a request from the priority device, in which the arbiter grants the priority device access to the shared resource;
      a fourth mode of operation, responsive to detecting a request from a shifting priority device, in which the arbiter grants the shifting priority device access to the shared resource and shifts the shifting priority device to a lowest priority among the plurality of shifting priority devices;
      a fifth mode of operation, responsive to detecting a request from at least two shifting devices from the plurality of shifting priority devices, in which the arbiter grants access to a shifting priority device having a highest priority among the at least two shifting priority devices; and
      a sixth mode of operation, responsive to granting access to the shifting priority device having the highest priority, in which the arbiter assigns a lowest priority to the shifting priority device granted access to the shared resource.

22. The data processing system of claim 21, wherein the arbiter further includes:
   a seventh mode of operation, responsive to the arbiter assigning the lowest priority to the shifting priority device granted access to the shared resource, in which the arbiter shifts priorities of remaining shifting priority devices relative to the shifting s priority device assigned the lowest priority.

23. The data processing system of claim 22, wherein the arbiter grants access to the shared resource after receiving at least one request within a single clock cycle.

24. A data processing system, comprising:
   a plurality of devices, the plurality of devices including a plurality of shifting priority devices; and
   an arbiter, wherein the arbiter receives requests from the plurality of devices for access to a shared resource, and wherein if one of the plurality of devices is a priority device, the arbiter chooses the priority device to access the shared resource, and if a priority device is absent, the arbiter chooses a device having a highest priority from of the plurality of shifting priority devices to access the shared resource.

25. The system of claim 24, wherein the requests are received approximately simultaneously.

26. The system of claim 24, wherein the requests are received within a single clock cycle.

27. The system of claim 24, wherein the shared resource is a bus.

28. The system of claim 24, wherein the data processing system is located on a chip.

29. The system of claim 24, wherein the data processing system is a personal computer.

30. The system of claim 24, wherein priorities of the plurality of shifting priority devices are shifted after choosing the device having the highest priority from the plurality of shifting priority devices to access the shared resource.

31. The system of claim 30, wherein the priorities of the plurality of shifting priority devices are shifted such that the priority of the device having the highest priority is shifted to a lowest priority within the plurality of shifting devices.

32. The system of claim 30, wherein the priorities of the plurality of shifting priority devices, other than the device having the highest priority, remain fixed with respect to each other as the priorities of the plurality of shifting priority devices shift.

* * * * *